(12) United States Patent
Lin et al.

(10) Patent No.: US 12,287,259 B2
(45) Date of Patent: Apr. 29, 2025

(54) TISSUE SECTIONING SYSTEM

(71) Applicant: JelloX Biotech Inc., Hsinchu (TW)

(72) Inventors: Yen-Yin Lin, Hsinchu (TW); Yu-Chieh Lin, Hsinchu (TW); Chia-Jung Lee, Hsinchu (TW)

(*) Notice: Subject to any disclaimer, the term of this patent is extended or adjusted under 35 U.S.C. 154(b) by 1133 days.

(21) Appl. No.: 16/935,191

(22) Filed: Jul. 22, 2020

(65) Prior Publication Data

US 2021/0025789 A1    Jan. 28, 2021

Related U.S. Application Data

(60) Provisional application No. 62/877,837, filed on Jul. 24, 2019.

(51) Int. Cl.
| | | |
|---|---|---|
| *G01N 1/06* | (2006.01) | |
| *G01N 1/28* | (2006.01) | |
| *G02B 21/02* | (2006.01) | |
| *G02B 21/24* | (2006.01) | |

(52) U.S. Cl.
CPC ............. *G01N 1/06* (2013.01); *G01N 1/286* (2013.01); *G01N 2001/061* (2013.01); *G01N 2001/2873* (2013.01); *G02B 21/02* (2013.01); *G02B 21/24* (2013.01)

(58) Field of Classification Search
CPC .. G01N 1/06; G01N 1/286; G01N 2001/2873; G01N 2001/061; G02B 21/02; G02B 21/24
USPC ........................................................ 83/409
See application file for complete search history.

(56) References Cited

U.S. PATENT DOCUMENTS

| | | | |
|---|---|---|---|
| 3,091,144 A * | 5/1963 | Fernandez-Moran ... | G01N 1/06 83/915.5 |
| 5,552,087 A | 9/1996 | Zeheb et al. | |
| 2009/0041316 A1* | 2/2009 | Koos .................... | G06V 20/693 382/128 |
| 2010/0000383 A1 | 1/2010 | Koos et al. | |

(Continued)

FOREIGN PATENT DOCUMENTS

| | | | | |
|---|---|---|---|---|
| JP | WO-2007023651 A1 * | 3/2007 | ............... | G01N 1/06 |
| JP | 2008164458 A * | 7/2008 | | |

OTHER PUBLICATIONS

Office Action and search report from the Taiwan Intellectual Property Office, May 27, 2021.

(Continued)

*Primary Examiner* — Ghassem Alie

(74) *Attorney, Agent, or Firm* — OPES IP Consulting Co., Ltd.

(57) ABSTRACT

The disclosure provides a tissue sectioning system for direct coupling with a microscope. The tissue sectioning system includes a frame having a blade module, a container containing a solution system, and a movable arm. Specifically, the blade module is used to slice a sample. The solution system in the container includes at least two solutions, which are the first and second solutions. Further, a refractive index of the first and second solutions is identical, and the first and second solution is immiscible with each other. The first moveable arm has two ends, which are the first end and second ends. The first and second ends connect to the container and the frame, respectively. Additionally, the first moveable arm moves the container along the Z-axis.

11 Claims, 8 Drawing Sheets

(56) References Cited

U.S. PATENT DOCUMENTS

| | | | | |
|---|---|---|---|---|
| 2014/0311471 A1* | 10/2014 | Gadd | ................... | B28D 5/0076 |
| | | | | 125/13.01 |
| 2014/0329269 A1 | 11/2014 | Adey et al. | | |
| 2016/0124202 A1* | 5/2016 | Huang | ................... | G02B 21/02 |
| | | | | 359/371 |
| 2018/0114697 A1* | 4/2018 | Sekiya | ................. | H01L 23/544 |
| 2018/0224648 A1* | 8/2018 | Shimada | .............. | G02B 21/367 |
| 2023/0045321 A1* | 2/2023 | Lihl | ........................ | B01L 1/025 |

OTHER PUBLICATIONS

Office Action from the Taiwan Intellectual Property Office, Feb. 14, 2022.

* cited by examiner

TISSUE SECTIONING SYSTEM

CROSS-REFERENCE TO RELATED APPLICATION

The present application claims priority to U.S. Provisional Application Ser. No. 62/877,837, filed on Jul. 24, 2019, which is hereby incorporated by reference in their entirety.

FIELD

This disclosure relates to the fields of microtomes and tissue sample sectioning system for producing sections of samples. More specifically, the present disclosure relates to microtomes and tissue sample sectioning system capable of direct coupling with a microscope.

BACKGROUND

Confocal microscopy provides multiple advantages over conventional wide-field optical microscopy. Examples includes the ability to control the depth of field, elimination or reduction of background information distant from the focal plane, and the capability to collect serial optical sections from thick specimens. The fundamental key of confocal microscopy is spatial filtering, which eliminates out-of-focus light or glare in specimens whose thickness exceeds the immediate plane of focus. Through confocal microscopy, sub-micron fluorescence biological images can be acquired. Nevertheless, the field of view of high Numerical Aperture (e.g., N.A.) objective lens of microscopes is limited. The foregoing leads to scattering effects in turbid tissues, which then limits the penetration depth of light.

U.S. patent application Ser. No. 12/583,471 (hereinafter "the '471 Application") (David S. Koos et al., 2009) discloses a microscope coupled tissue sectioning system. The tissue sectioning system includes a frame for coupling with a microscope and a sample cutting apparatus attached to the frame. Further, the microscope coupled tissue sectioning system aims to overcome issues ordinarily seen in two types of traditional imaging technique, which are Section-Based imaging and Block-Based imaging. Specifically, Section-Based imaging is tedious, time-consuming, and very labor-intensive, sometimes requiring several days, and suffers from several other drawbacks. Although Block-Based imaging solves certain issues of Section-Based imaging, Block-Based imaging is difficult to implement due to the limitation of certain necessary materials.

In the '471 Application, the sample sectioning device is used to remove a portion of the sample. Additionally, a sample moving apparatus is utilized to align the sample with an imaging path of a microscope to facilitate the imaging by the microscope. However, the device taught in the '471 Application still possseses certain drawbacks, such as 1) image capture field is fixed due to that samples are fixed on an x-y plane; 2) deteriorated performance during longtime imaging, and 3) the requirement of a large space.

U.S. patent application Ser. No. 13/244,297 (Yuan-An Liu et al., 2011) discloses a method of visualizing the 3-dimensional microstructure of thick biological tissue. The disclosure discloses a method that includes: 1) a process of immersing thick, opaque biological tissues in an optical-clearing solution; 2) utilizing an optical scanning microscope to capture an image; and 3) removing a portion of the tissue, of which image has been taken, with a cutter. In microscopy, the cutter removes a portion of the tissue after each round of optical scanning. Each round of optical scanning follows the principle that the depth of the removal plane is less than the depth of the boundary plane derived from the scanning. This method acquires an image stack to provide the information of thick biological tissue's 3-dimensional microstructure with minimal interference by the tissue removal.

Wu, Hao, et al. discloses that the combination of optical clearing with light microscopy has several applications in the whole-brain imaging of mice. (Hao Wu et al., On-line optical clearing method for whole-brain imaging in mice., Biomedical optics express 10.5 (2019): 2612-2622.) Hao Wu et al. brings up the primary issues of prior methods/techniques, including: 1) enormous time consumpetion of the initial processing for optical clearing, and 2) complicated protocols. Then, Hao Wu et al. proposes a method based on on-line optical clearing. During initial processing, agarose-embedded mouse brain was immersed in the optical clearing reagent, and clearing of the brain was achieved ~100 μm beneath the sample surface. Thereafter, after imaging, the cleared layer is removed, thereby allowing layer-by-layer clearing and imaging. As such, there is no need of pre-immersion and the protocol is simplified. The imaging time may be reduced by fifty percent. However, it is also observed that in Hao Wu et al., if a sample requires a long imaging time, the ultimate image resolution becomes low. Furthermore, only samples with certain sizes may fit the system taught by Hao Wu et al.

Therefore, there is a need to develop a novel tissue sectioning system capable of processing larger samples effectively and efficiently, and of universal coupling to existing microscope systems.

SUMMARY OF THE DISCLOSURE

The present disclosure disclosures a tissue sectioning system coupled with the microscope for thick biological tissue visualization. An iterative sectioning-imaging process is implemented to overcome the limitations by removing a sample layer after being imaged. One of the benefits of the present disclosure is that large amount of digital images are capable of being acquired in an automated manner without sample distortion and information loss. The present disclosure is especially helpful in facilitating neural and histopathology research.

The present disclosure discloses a sectioning system having a mounting frame extension moveable along the X-Y-Z axes independently. Specifically, the frame does not protrude into or occupy the imaging region of a microscope. In other words, the imaging region of the microscope is least or even not obstructed by the frame. As a result, the sectioning system of the present disclosure enables the user to utilize the space between an objective and a sample stage of the microscope more effectively. Consequently, desired quality of three-dimensional images of a larger sample can be more easily acquired in a timely manner. From another perspective, users may choose to install objectives of larger sizes so as to acquire higher quality images.

Additionally, the present system includes a sample tank. During the imaging process of the present disclosure, a tissue sample is immersed into a clearing reagent to enlarge the acquisition depth of each layer of the tissues sample. As such, sectioning process may be simplified and the requirement for sectioning accuracy may be lowered and yet a result of identical or even better quality can be achieved.

The present disclosure provides a double-layered liquid system, such as a sample immersion solution consisting of clearing reagent and protective material. The protective material is utilized for keeping the clearing reagent of the system from directly contacting with the environment for evaporation prevention purposes. Further, the refractive index of the protective material is identical to that of the clearing reagent. The foregoing serves to maintain the imaging quality of the system.

The present disclosure discloses a tissue sectioning system for direct coupling with a microscope. The tissue sectioning system includes a frame having a blade module, a container containing a solution system, and a movable arm. Specifically, the blade module is used to slice a sample. The solution system in the container includes at least two solutions, which are the first and second solutions. Further, a refractive index of the first and second solutions are identical, and the first and second solutions are immiscible with each other. The first moveable arm has two ends, which are the first end and second ends, and the first and second ends connect to the container and the frame, respectively. Additionally, the first moveable arm moves the container along the Z-axis. In other words, the first moveable arm moves the container vertically.

In another embodiment, the tissue sectioning system is coupled with a microscope having an objective and a base. The tissue sectioning system couples with the microscope via a frame, and a travel path of the first moveable arm does not intersect the space between the objective and the base of the microscope. In other words, the space between the objective and the base is left uninterrupted.

In another embodiment, the first moveable arm does not travel between the objective and the base of the microscope.

In another embodiment, the tissue sectioning system further includes a second moveable arm for moving the platform along the X-axis or the Y-axis. In other words, the first moveable arm moves the container horizontally.

In another embodiment, a travel path of the second moveable arm does not intersect the space between the objective and the base of the microscope.

In another embodiment, the second moveable arm does not travel between the objective and the base of the microscope.

In another embodiment, a travel range along one of the X, Y or Z axes of the first moveable arm or the second moveable arm is between about 50 to 200 mm, between about 60 to 200 mm, between about 70 to 200 mm, between about 80 to 200 mm, between about 90 to 200 mm, between about 100 to 200 mm, between about 110 to 200 mm, between about 120 to 200 mm, between about 130 to 200 mm, between about 140 to 200 mm, between about 150 to 200 mm, between about 160 to 200 mm, between about 170 to 200 mm, between about 180 to 200 mm, or between about 190 to 200 mm. The travel range thereof may be adjusted corresponding to specific needs, such as size of the tissue sample or the objective of the microscope.

In another embodiment, a travel range along one of the X, Y or Z axes of the first moveable arm or the second moveable arm is between about 50 to 190 mm, between about 50 to 180 mm, between about 50 to 170 mm, between about 50 to 160 mm, between about 50 to 150 mm, between about 50 to 140 mm, between about 50 to 130 mm, between about 50 to 120 mm, between about 50 to 110 mm, between about 50 to 100 mm, between about 50 to 90 mm, between about 50 to 80 mm, between about 50 to 70 mm, between about 50 to 60 mm. The travel range thereof may be adjusted corresponding to specific needs, such as size of the tissue sample or the objective of the microscope.

In another embodiment, the first solution is a tissue cleaning solution, and the second solution is a protective solution, and the second solution covers the first solution not to contact an atmosphere.

In another embodiment, the first solution is one of the following: water, glycerol, histodenz, formamide (F), triethanolamine (TEA), and meglumine diatrizoate.

In another embodiment, the second solution is one of the following: silicone oil and microscope immersion oil.

In another embodiment, a travel range of the container is about 50 to 150 mm.

In another embodiment, the height of the container is about 50 to 100 mm.

In another embodiment, the refractive index of the first and second solution is between about 1 to 1.9, between about 1.1 to 1.9, between about 1.2 to 1.9, between about 1.3 to 1.9, between about 1.4 to 1.9, between about 1.5 to 1.9, between about 1 to 1.8, between about 1 to 1.7, between about 1 to 1.6, between about 1 to 1.5, between about 1.1 to 1.8, between about 1.2 to 1.7, between about 1.3 to 1.6, or between about 1.4 to 1.6.

In another embodiment, the refractive index of the first and second solution is between about 1.4 to 1.6, between about 1.4 to 1.59, between about 1.4 to 1.58, between about 1.4 to 1.57, between about 1.4 to 1.56, between about 1.4 to 1.55, between about 1.4 to 1.54, between about 1.4 to 1.53, between about 1.4 to 1.52, between about 1.4 to 1.51, or between about 1.4 to 1.5.

In another embodiment, the refractive index of the first and second solution is between about 1.40 to 1.52.

In another embodiment, the tissue sectioning system comprises a computer that electrically connects and controls the movement of with the frame. The movement of the frame may correspond to the tissue slicing of the blade module.

BRIEF DESCRIPTION OF THE DRAWINGS

One or more embodiments are illustrated by way of example, and not by limitation, in the figures of the accompanying drawings, wherein elements are having the same reference numeral designations represent like elements throughout. The drawings are not to scale unless otherwise disclosed.

FIG. 1A depicts a front view of a traditional microscopy, and FIG. 1B depicts a side view thereof.

FIG. 2A depicts a conceptual composition of components of the present disclosure. FIG. 2B is a sectional view of the present disclosure. FIG. 2C discloses a side view of the present disclosure. and FIG. 2D is a comparison between a microscope plus sectioning system of the present disclosure with that of the prior art.

FIG. 3A is a side perspective view of the present solution system in a container. FIG. 3B illustrates the procedure of acquiring a whole tissue three-dimensional image using the sectioning system of the present disclosure. FIG. 3C is a comparison between the operation of present disclosure with that of the prior art.

Figure 1A:
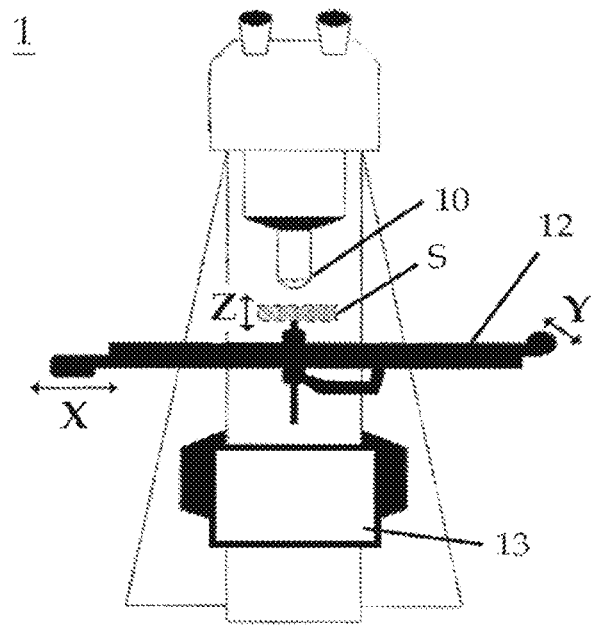
FIGS. 1A-1B are schematic illustrations of traditional microscopy.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the disclosure. Any reference signs in the claims shall not be construed as limiting the scope. Like reference symbols in the various drawings indicate like elements.

DETAILED DESCRIPTION

The making and using of the embodiments of the disclosure are discussed in detail below. It should be appreciated, however, that the embodiments provide many applicable inventive concepts that can be embodied in a wide variety of specific contexts. The specific embodiments discussed are merely illustrative of specific ways to make and use the embodiments and do not limit the scope of the disclosure.

Throughout the various views and illustrative embodiments, like reference numerals are used to designate like elements. Reference will now be made in detail to exemplary embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, an apparatus in accordance with the present disclosure. It is to be understood that elements not specifically shown or described may take various forms. Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. It should be appreciated that the following figures are not drawn to scale; rather, these figures are merely intended for illustration.

In the drawings, like reference numbers are used to designate like or similar elements throughout the various views and illustrative embodiments of the present disclosure are shown and described. The figures are not necessarily drawn to scale, and in some instances, the drawings have been exaggerated and/or simplified in places for illustrative purposes. One of ordinary skill in the art will appreciate the many possible applications and variations of the present disclosure based on the following illustrative embodiments of the present disclosure.

Definition

It will be understood that when an element is referred to as being "on" another element, it can be directly on the other element or intervening elements may be present. In contrast, when an element is referred to as being "directly on" another element, there are no intervening elements present.

It will be understood that singular forms "a," "an," and "the" are intended to include the plural forms as well unless the context indicates otherwise. Furthermore, relative terms, such as "bottom" and "top," may be used herein to describe one element's relationship to other elements as illustrated in the Figures.

It will be understood that elements described as "under" or "below" other elements would then be oriented "over" or "above" the other elements. The exemplary terms "under" or "below" can, therefore, encompass both an orientation of over and under.

The term "about," as used herein, when referring to a measurable value such as an amount, a temporal duration, and the like, is meant to encompass variations of ±10% and more preferably ±5% from the specified value, as such variations are appropriate to perform the disclosed methods.

Unless otherwise defined, all terms (including technical and scientific terms) used herein have the same meaning as commonly understood by one of ordinary skill in the art to which this disclosure belongs. It will be further understood that terms; such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1A discloses a microscope 1 (e.g., an upright microscope) ordinarily seen across laboratories in the relevant industry. As FIG. 1A discloses, a sample loading stage 12 is disposited between an objective 10 and a bottom frame 13 of the microscope 1. Further, a sample S is loaded on the sample loading stage 12. A user can adjust a position of the sample S through moving the loading stage 12 to adjust focus target or focal length on the sample S. The loading stage 12 usually is an extension of and is moveable relative to the bottom frame 13. Specifically, a user can move the sample S along the X-axis, Y-axis, or Z-axis by an adjustment wheel of the loading stage 12. As such, an ordinary microscope can only accept certain size/dimension of samples due to the configuration of the sample loading stage 12 and the bottom frame 13. Specifically, the distance between the objective 10 and the sample loading stage 12, or the bottom frame 13, is limited, and such distance is one of major factors that limits whether a user could image the sample S through the microscope 1. In one example, if the sample S is too thick, it may not be imaged by the microscope 1.

Figure 1B:
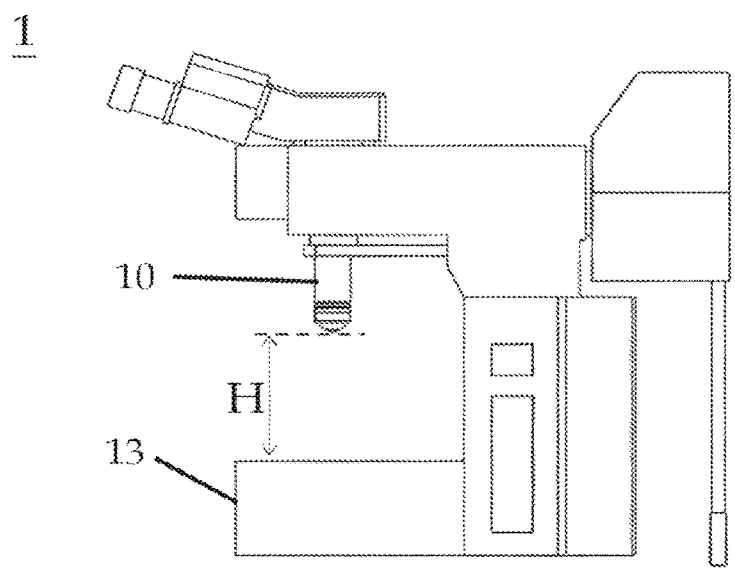

As FIG. 1B discloses, a typical distance H between the objective 10 and a bottom frame 13 is about 100 to 120 mm. Therefore, excluding the space required by a sample holding stage, the maximum sample size (e.g., height or thickness) that could fit between the objective 10 and a bottom frame 13 is about 100 to 200 mm. It is worth to note that the foregoing example is to assume that a sample holding stage 12 is lowered to a basic/lowest position, which engages with the bottom frame 13. In another example, the sample holding stage 12 may be removed.

TABLE 1

List of commercial motorized elevator-Z stages

| No. | Manufacture | Part Number | Dimension (mm) (L × W × H) | Travel range (mm) |
|---|---|---|---|---|
| 1 | Sigma Koki | OSMS80-20ZF | 80*80*108 | 20 |
| 2 | GMT Linear | AZV9020-A8PN-CD | 140*90*82 | 20 |
| 3 | CHUO PRECISION INDUSTRIAL | ALV-120-HP | 254*125*70 | 20 |

Table 1 lists the specification of the most common motorized elevator-Z stages for an upright microscope. As Table 1 shows, even though each commercial stage has their respective sizes, their travel range (i.e., available distance of travel along the Z-axis) is limited. From Table 1, the Z-axis travel range of all three most common commercial stages is 20 mm. Some other commercial stages may allow Z-axis travel range up to 30 mm. However, the foregoing is still very limiting. The sample size is confined within such Z-axis travel range and even less, because the size of the sample holding stage also needs to be counted in. As such, samples of larger sizes cannot be placed between the objective 10 and the frame 13 and imaged.

Figure 2A:
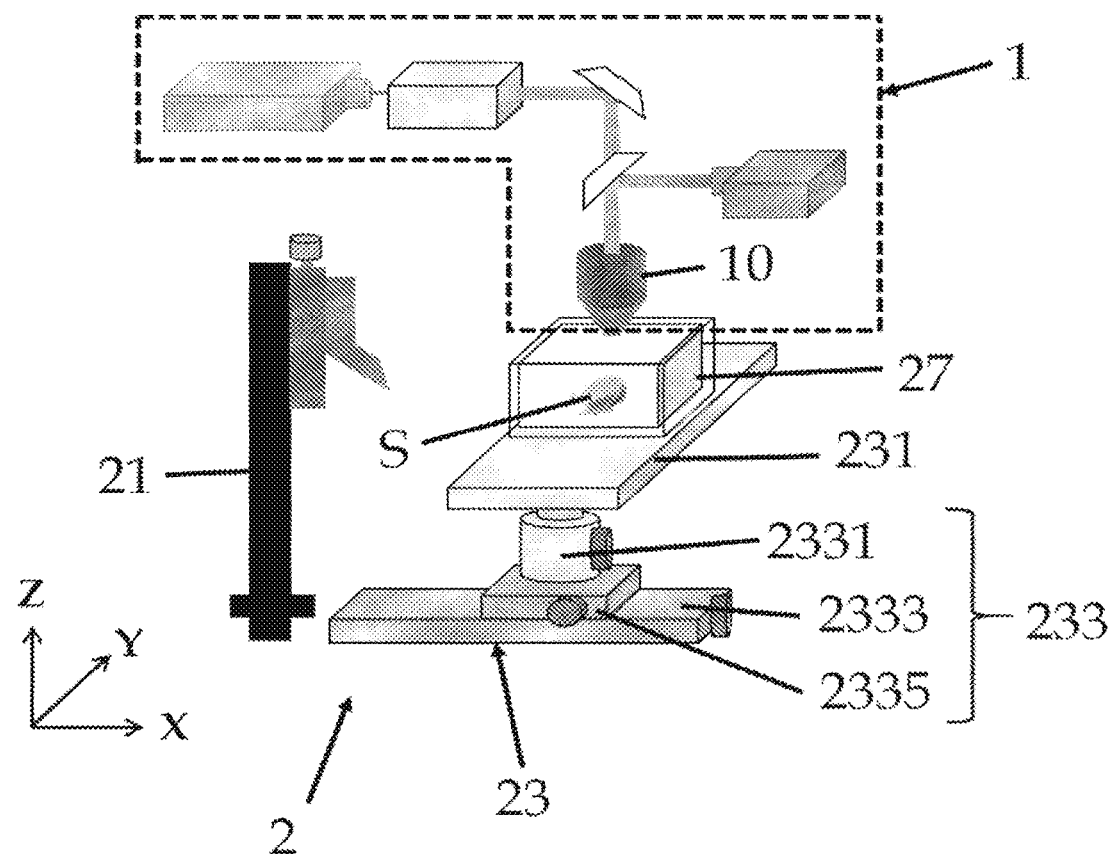
FIGS. 2A-2D are schematic illustrations of present tissue sectioning system coupled with a microscope.

FIG. 2A depicts a conceptual illustration of certain embodiments of the present disclosure, which is a tissue sectioning system 2 couplinged with a microscope 1. As the figure shows, the tissue sectioning system 2 includes a sectioning module 21 and a motorized sample stage 23. Further, the motorized sample stage 23 includes a loading platform 231 for holding a sample tank 27, which is used to contain a sample S. and the sample stage 23 also includes a control arm 233 for adjusting the position of the sample tank 27. Specifically, the control arm 233 consists of three axial movement arms 2331, 2333, 2335, which corresponds to the Z-axis, Y-axis and X-axis respectively. The axial movement arm 2331 may be referred to as the first moveable arm, and either of the axial movement arms 2333, 2335 may be referred to as the second moveable arm in this disclosure. Each arm includes a control wheel for an operator to control the respective axial movement. In certain embodiments, each axial movement arm 2331, 2333, 2335 only moves along one axis. For example, the axial movement arm 2331 only moves along the Z-axis, the axial movement arm 2333 only moves along the Y-axis, and the axial movement arm 2335 only moves along the X-axis. The axial movement arm 2331 is connected to one end of the loading platform 231, and the sample tank 27 is loaded on an extension portion of the loading platform 231.

Figure 2B:
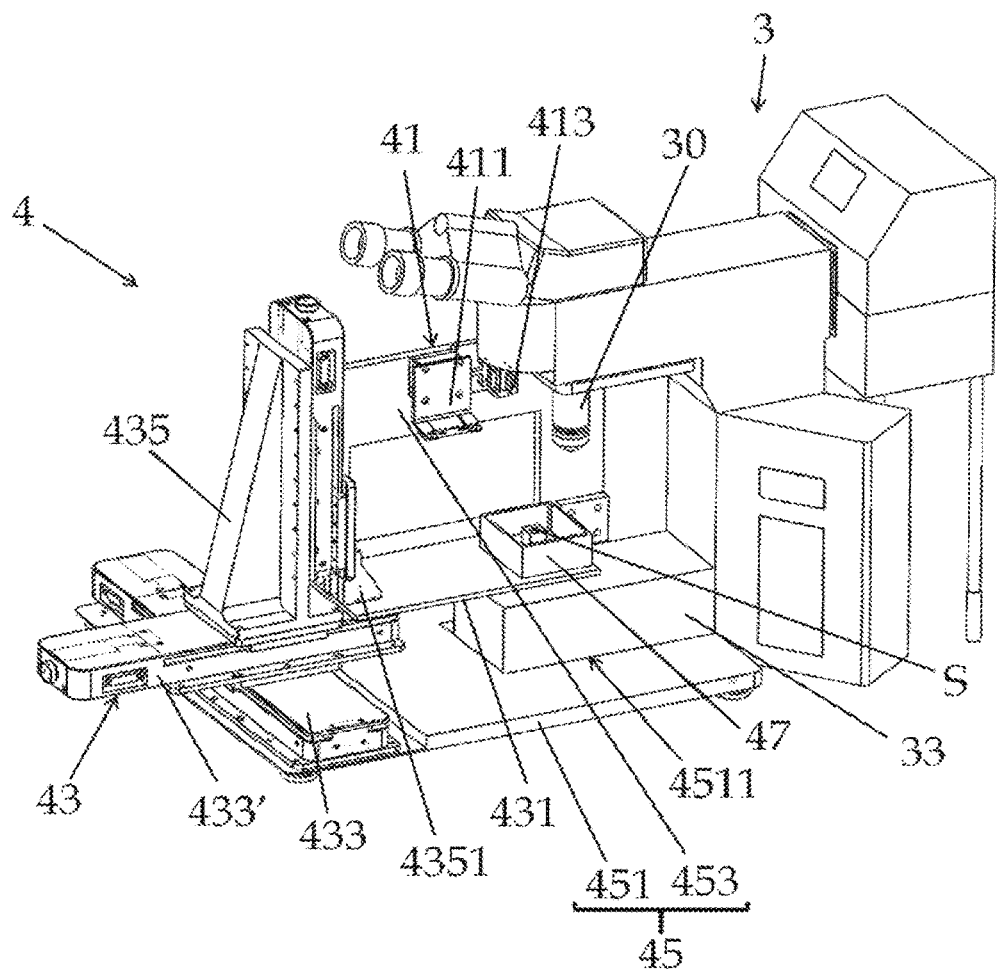

FIG. 2B discloses some embodiments of present disclosure of a tissue sectioning system 4 coupled with a microscope 3. Here, the main structure of the tissue sectioning system 4 includes a vibratome 41, a motorized sample holder 43 and a frame 45. The frame 45 is an L-shaped structure in general, and includes a base plate 451 and a side-wall 453. The base plate 451 has an U-shaped structure 4511 to fit with the bottom frame 33 of the microscope 3. In other words, the bottom frame 33 of the microscopy 3 fills the concave of the U-shaped structure 4511 of the base plate 451 to couple with the frame 45. The vibratome 41 is positioned at a side of the side-wall 453 facing the microscopy 3. The vibratome 41 includes a blade module 411 and a vibrator 413. The blade module 411 is configured to facilitate/be equipped with different blades based on different needs. Further, a user is capable of adjusting the angle between the blade it's carrying and the sample S through the blade module 411 to facilitate different needs, e.g., different sample cutting thickness.

The motorized sample holder 43 includes two horizontal arms 433, 433', a vertical arm 435, and a sample stage 431. The horizontal arm 433' is sandwiched between the horizontal arm 433 and the vertical arm 435. Further, the two horizontal arms 433, 433' are perpendicular to each other, and the vertical arm 534 is perpendicular to each of the horizontal arms 433, 433'. The vertical arm 534 may be referred to as the first moveable arm, and either of the two horizontal arms 433, 433' may be referred to as the second moveable arm in the present disclosure. An adaptor 4351 of the vertical arm 435 is connected to one end of the sample stage 431, and a sample tank 47 is sits at the opposite end of the sample stage 431. In some embodiments, the sample tank 47 and the sample stage 431 are an integrated structure. The horizontal arm 433 connects to the base 451, and more specifically to the opposite side of the concave of the U-shaped structure 4511. In certain embodiments, each arm of the motorized sample holder 43 is only capable of moving alone one axis (i.e., the X-axis, Y-axis or Z-axis). From another perspective, the horizontal arms 433, 433' are responsible for controlling the horizontal movement, i.e., movement along the X-axis and Y-axis, of the sample stage 431, and the vertical arm 435 is responsible for controlling the vertical movement, i.e., movement along the Z-axis, thereof. As such, the position of the sample tank 47 and the sample S therein can be adjusted.

Figure 2C:
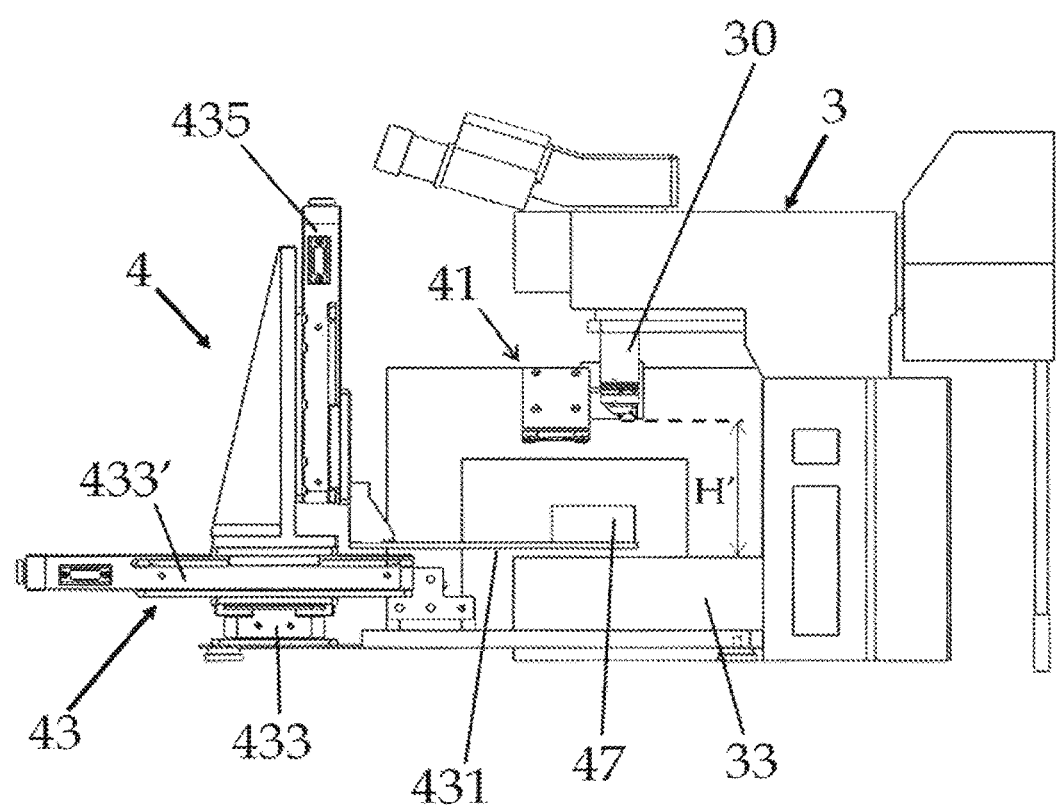

FIG. 2C discloses a side perspective view of the tissue sectioning system 4 coupled with a microscope 3. Here, one end of the sample stage 431 connects to the vertical arm 435 at a location away from the microscope 3. In other words, only the sample stage 431, and not the vertical arm 435, extends toward the microscope 30, and more specifically, into the space between the objective 30 and the bottom frame 33. The two horizontal arms 433, 433' also do not occupy the space between the objective 30 and the bottom frame 33 of the microscopy 3. As such, the entire space between the the objective 30 and the bottom frame 33 can be utilized to accommodate the sample to be imaged. In certain examples, a distance H' between the objective 30 and the bottom frame 33 of the microscopy 3 is about 100 to 120 mm, and the dimension of a sample stage 431 is about (H) 5 mm×(W) 75 mm×(L) 200 mm. Therefore, the vertical travel range of the sample stage 431 is about 95 to 115 mm, and thus a maximum thickness of a sample is about 110 mm. From another perspective, over 95% (115 out of 120 mm) of the distance/height between the objective 30 and the bottom frame 33 can be used to receive the sample. Accordingly, the tissue sectioning system of the present disclosure serves to accommodate a much wider range of sample sizes capable to be imaged by most common microscopes in the market.

With reference to FIGS. 2B, 2C, 2D, 3A and 3D, an imaging process using the tissue sectioning system of the present disclosure includes the following steps: a) immersing the sample S into the imaging solution 49 in the sample tank 47; b) moving the sample S under an objective 30 by controlling the motorized sample holder 43; c) selecting an target at the sample S and keeping the target within focus of the objective 30 by the motorized sample holder 43; d) imaging the target portion; e) moving the sample S to the vibratome 41 and using the blade module 411 thereof to remove a layer of the sample S; f) moving the sample S back to the focus of the objective 30 and repeats imaging, and g) repeating the steps e) and f) until the entire sample S is imaged or until the sample S can no longer be sliced by the blade module 411. In some embodiments, the sample S could be pretreated. Alternatively, the sample S can be imaged without pretreatment. In certain embodiments, the tissue sectioning system 4 is connected to and controlled by a computer (not shown in the drawing). As such, the tissue sectioning system 4 becomes automated and can be programmed for imaging as desired. Moreover, the computer serves to record the position and corresponding focus of the motorized sample holder 43 and the sample S thereon. As a result, the sample S can be sliced and moved to desired locations more precisely after each imaging of the microscope 3. The continued precise imaging of the sample S can later be reconstructed into three-dimensional images in a more desired manner and resolution.

Figure 2D:
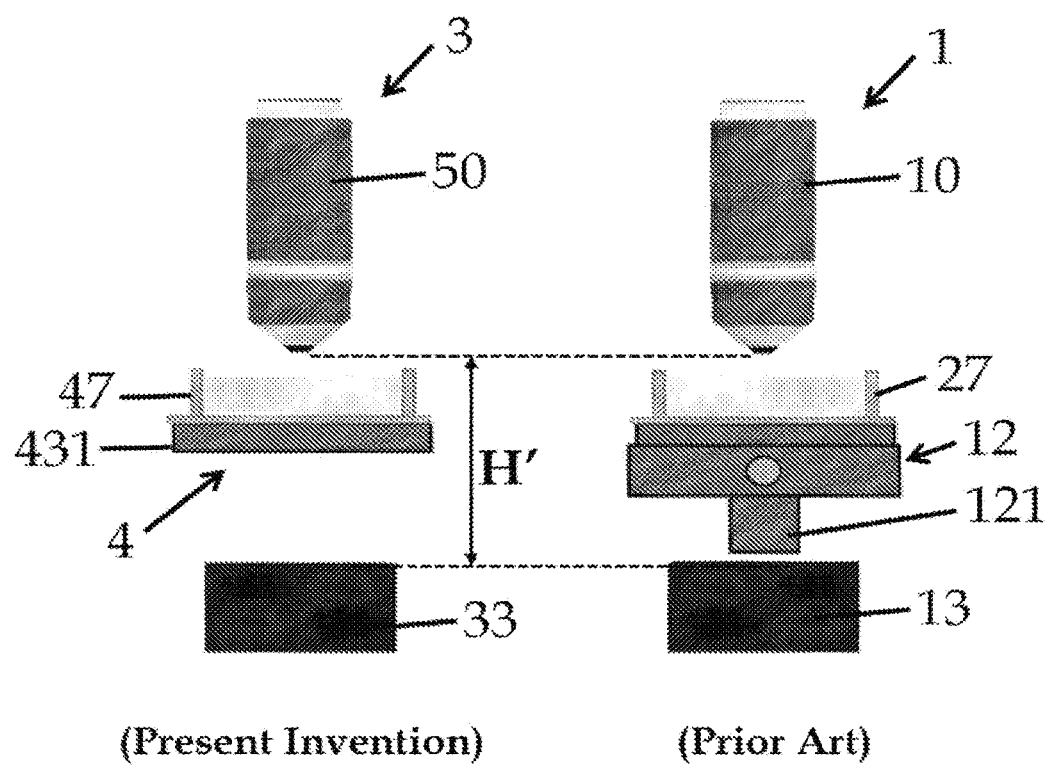

FIG. 2D discloses a comparison between the tissue sectioning system of the present disclosure and of the prior art. In the prior art (microscope 1), the sample loading stage 12 is positioned directly above the bottom fame 13. Specifically, a Z-axis movement arm 121 of the sample loading stage 12 is also located directly above the bottom fame 13 for controlling vertical movement of the sample tank 27 on the sample loading stage 12. Note that the distance between the bottom of the objective 10, 50 and the top surface of the bottom frame 13, 33 is H'. Therefore, the maximum sample capacity, i.e., height thereof, for the microscope is the height H' deducting the thickness of the bottom of the sample tank 27 and the thickness of the sample loading stage 12. Attention is directed to the figure on the left in FIG. 2D, which is the present disclosure. Here, none of the component of the motorized sample holder 43 of the tissue sectioning system 4 occupies the space between the sample stage 431 and the bottom frame 33. From another perspective, the vertical arm 435 (not shown in FIG. 2D for clarity) does not travel between the objective 50 and the bottom frame 33. In other words, the vertical arm 435 does not occupy the space between the objective 50 and the bottom frame 33. As such, more space and latitude is left to facilitate the sample S. Only the thickness of the sample stage 431 and the bottom of the sample tank 47 affect the sample size that may be accommodated the microscopy 3. On the other hand, in the prior art, the Z-axis movement arm 121 also occupies the space between the objective 10 and the bottom frame 13. As such, lesser height is left for the sample S. In sum, the tissue sectioning system 4 of the present disclosure enables the microscopy 3 to receive a larger-sized sample for imaging compared to the ordinary tissue sectioning systems. Specifically, in the present disclosure, the travel range of the sample stage 431 along the Z-axis is about 50 to 200 mm. The feasible sample size is about (H) 100 mm×(W) 75 mm×(L) 150 mm. The preferred sample size is about (H) 50 mm×(W) 50 mm×(L) 100 mm so as to achieve a more desired imaging result.

Figure 3A:
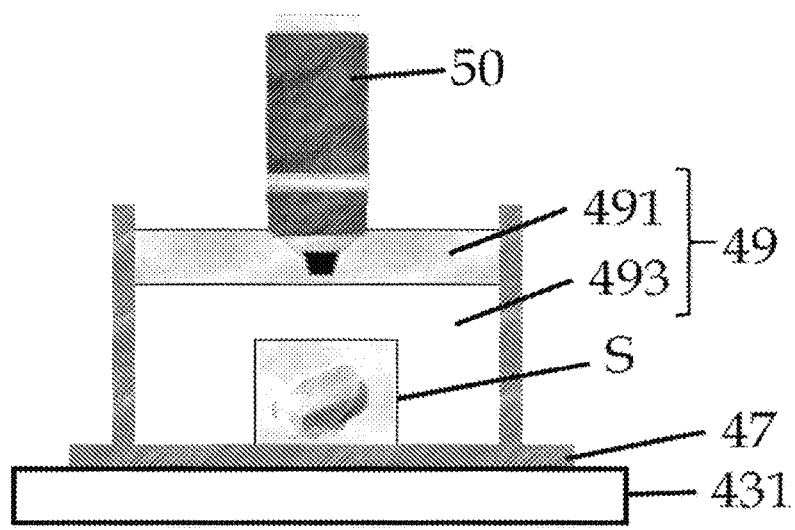
FIGS. 3A-3C are schematic illustrations of the structure and operation of the present tissue sectioning system.

FIG. 3A discloses the details of the sample tank 47 according to one embodiment of the present disclosure. The sample S, for example, an agarose gel embedded mouse brain, is immersed inside the sample tank 47. Further, the sample tank 47 is filled with an imaging solution 49. In some embodiments, the imaging solution 49 consists of a solution system having at least two different solutions. In one example, the imaging solution 49 includes two solutions, which are a reaction solution 491 and a protection solution 493. The reaction solution 491 is a solution mixture that includes an aqueous optical-cleaning solution, which makes a tissue sample transparent to allow light to travel through. In certain embodiments, the density of the reaction solution 491 and protection solution 493 are different. More specifically, the density of the protection solution 493 is lower than that of the reaction solution 491. However, the refractive index of the protection solution 493 and reaction solution 491 are identical. In one embodiment of the present disclosure, the protection solution 493 is silicone oil, and a reaction solution 491 is a mixture of water and glycerol.

Figure 3B:
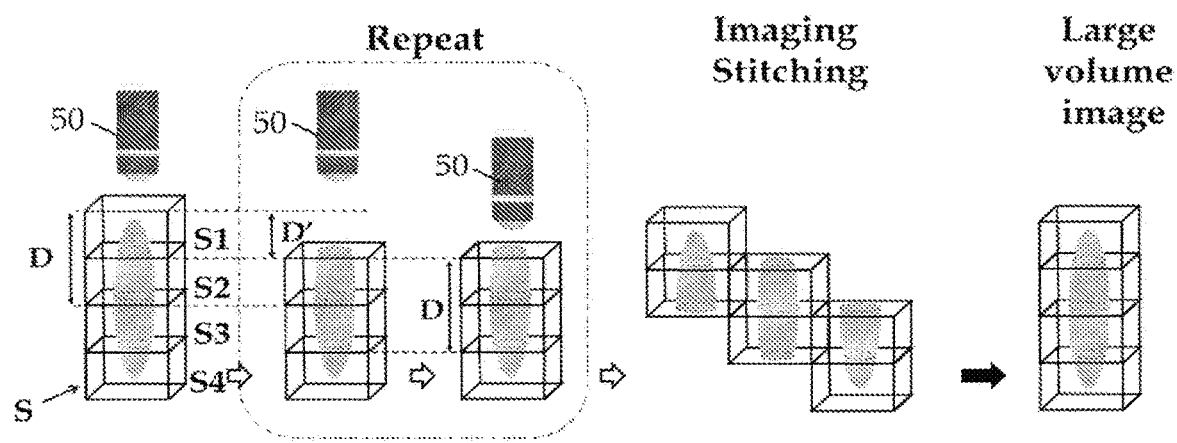
Figure 3B:
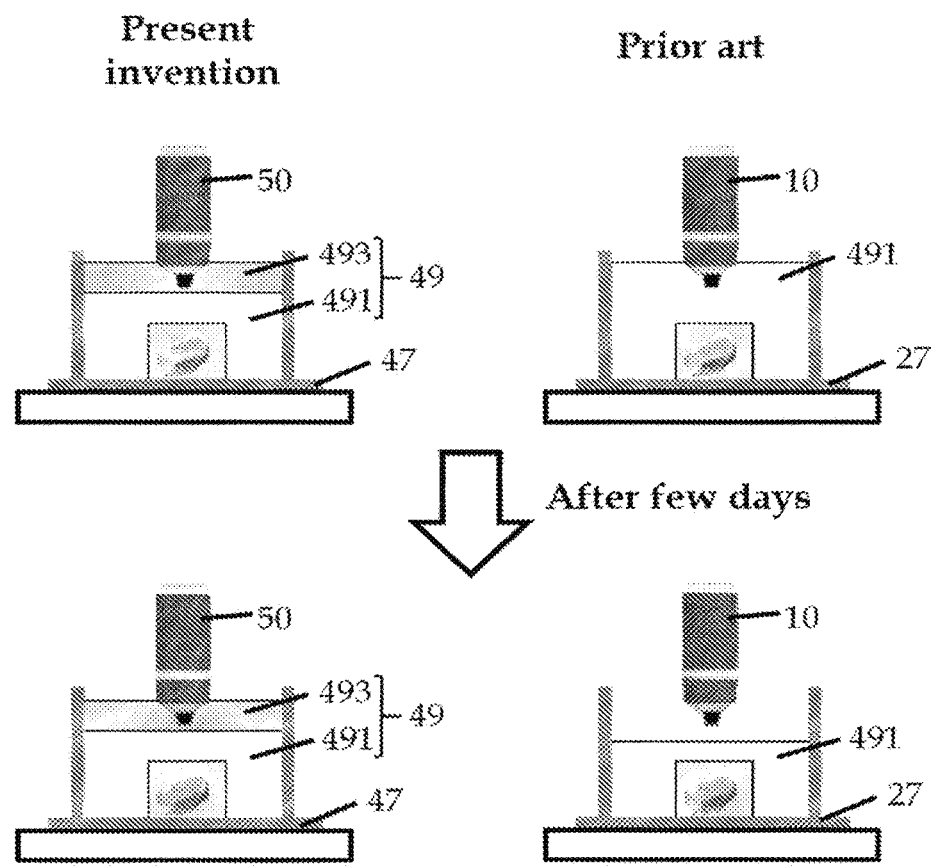

Although an aqueous optical-cleaning solution 491 is capable of making a tissue sample S more transparent or clear to allow light to travel therethrough, the effectiveness of the optical-cleaning solution 491 will be affected by the size/thickness of a sample S. Therefore, when trying to acquire an entire three dimensional image of a large sample S utilizing the present disclosure, a user needs to image different portions of the sample S respectively and later combine/attach all images to generate the entire three dimensional tissue image. FIG. 3B illustrates a flow diagram of sample imaging utilizing the present disclosure. As shown, a depth D represents a maximum thickness that an optical light from the objective 50 could penetrate. In one embodiment of present disclosure, the depth D is about 0.1 to 0.3 mm. In other words, only the first two sample layers (i.e., S1 and S2) of the sample S can be imaged. After acquiring the images of two sample layers S1 and S2, the sample layer S1 is removed, e.g., sliced. Therefore, the optical light from the objective 50 now may penetrate through the sample layers S2 and S3. Next, the sample layers S2 and S3 are imaged. In other words, it takes three steps to complete the imaging of the sample S. Specifically, the sample layers S1, S2 are imaged in the first step, the sample layers S2, S3 are imaged in the second step, and the sample layers S3, S4 are imaged in the final step. If the sample S is thicker, e.g., may be sliced into more layers, the number of image steps will be increased accordingly. It is worth to note that each layer of the sample S is imaged more than once during the entire imaging process. For example, the sample layer S2 is imaged in the first and second steps, and the sample layer S3 is imaged in the second and final steps. When the blade module 411 slices an upper tissue layer off the sample S between two imaging steps, the slicing blade may cause a rupture near the slicing interface, for example, an interface between the sample layers S1 and S2, S2 and S3, or S3 and S4. The aforementioned repeated imaging of the respective layers serves to eliminate this issue. Specifically, each slicing interface is at least imaged one before being sliced. As a result, even if the slicing interface is later damaged, at least one complete image is captured already. Moreover, the final three dimensional tissue image will be more continuous and complete and have a more desired resolution.

Figure 3C:
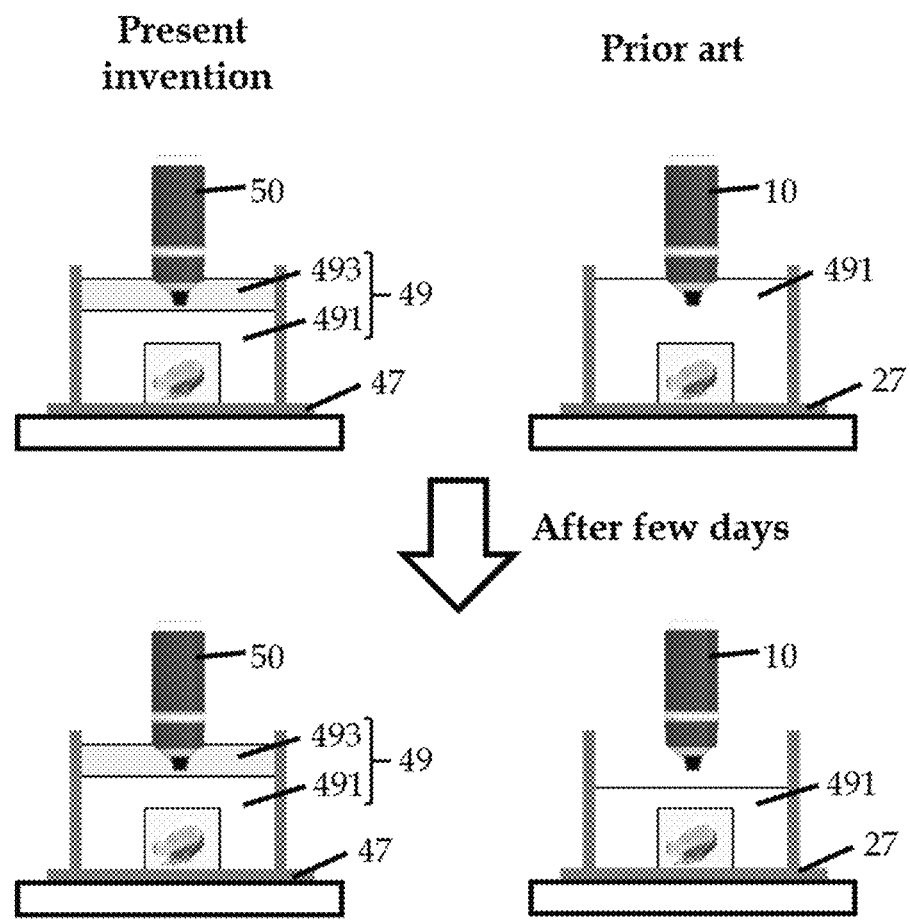

As mentioned above, the microscope 3 applying to the tissue sectioning system 4 of the present disclosure will image different layers/portions of the sample S and later combine/attach the images to generate a continuous tissue image. Ordinarily, slicing through the sample S and generating a continuous tissue image is very time consuming, and image quality will deteriorate over time. As such, the present disclosure presents an imaging solution 49, i.e., a solution system, as shown on the left hand side of FIG. 3C. Moreover, FIG. 3C compares the solution system in the tank 27, 47 over an extended imaging process between the prior art and the present disclosure. As depicted on the right hand side, when there's only clearing reagent 491, the height of the clearing reagent/solution 491 will decrease gradually due to evaporation because the imaging process usually takes a few days. As a result, the objective 10 will no longer be immersed within and will emerge from the clearing solution. The focus of the objective 10 will shift and the eventual imaging result will be affected in an undesired manner.

In the present disclosure, to overcome the aforementioned issue, an additional protective solution 493 is applied to cover the clearing solution 491 in the tank. As shown on the left hand side of FIG. 3C, the imaging solution 49, i.e., the solution system, further includes a protective solution 493 overlaying the reaction solution 491 (e.g., a cleaning solution) to prevent evaporation of the reaction solution 491 during an extended imaging process. In one embodiment of the present disclosure, a protective solution 493 is silicone oil or microscope immersion oil. In another embodiment of the present disclosure, the reaction solution 491 includes water, glycerol, histodenz, formamide (F), triethanolamine (TEA), meglumine diatrizoate or any combination thereof. Moreover, the refractive index of the protection solution 493 and the cleaning solution 491 are identical. In one embodiment of the present disclosure, a refractive index of the cleaning solution 493 and the protection solution 491 are both 1.41. In another embodiment, a refractive index of the cleaning solution 493 and the protection solution 491 is from 1.40 to 1.52. Further, to ensure that the protective solution 493 cover/lies over the cleaning solution 491, the density of the protection solution 493 is less than that of the cleaning solution 491.

Collectively, the present disclosure achieves the following advantages over the prior arts. First, sample sizes to be imaged are less limited because space between objective and base of microscopes are better utilized. Second, more desired eventual three dimensional images are acquired there won't be damaged tissues imaged. Third, no unwanted adjustment of the focus of the objective is needed because evaporation of the clearing reagent over time is prevented.

The invention claimed is:

1. A tissue sectioning system, comprising:
a blade module for slicing a sample;
a sample container for accommodating a solution system having a first solution and a second solution, wherein a refractive index of the first and second solutions is identical, and the first and second solutions are immiscible, wherein the sample is immersed in the solution system; and
a movable sample holder on which the sample container is fixedly mounted, wherein the movable sample holder is configured to positionally move the sample container out of a predetermined position to the blade module and then back to the predetermined position after the sample is sliced by the blade module, wherein
the movable sample holder includes a first movable arm, a second movable arm and a third moveable arm,
the first moveable arm is configured to travel horizontally along a X-axis, and the second moveable arm is configured to travel horizontally along a Y-axis in conjunction with X-axis travel of the first moveable arm, relative to the predetermined position,
the third moveable arm is configured to travel vertically along a Z-axis in conjunction with X-axis and Y-axis travel of the first and second moveable arms, relative to the predetermined position, and
the sample container includes first and second ends, the sample being fixedly contained to the first end of the sample container, at least one of the first, second and third moveable arms being connected to the second end of the sample container, the movable sample holder being configured such that the sample container is moveable and spatially accommodatable relative to the predetermined position and the blade module in the X-axis, Y-axis and Z-axis while the first, second and third moveable arms are positioned away from the predetermined position.

2. A microscope, comprising:
a body having an objective and a base; and
a tissue sectioning system, comprising:
a frame having a blade module fixedly mounted thereon for slicing a sample;
a sample container, including: a solution system having a first solution and a second solution, wherein a refractive index of the first and second solutions is identical, and the first and second solutions are immiscible, wherein a sample is immersed in the solution system; and
a movable sample holder on which the sample container is fixedly mounted, wherein the movable sample holder is configured to positionally move the sample container out of a focus of the objective to the blade module and then back to the focus of the objective after the sample is sliced by the blade module, wherein
the movable sample holder includes a first movable arm, a second movable arm and a third moveable arm,
the first moveable arm is configured to travel horizontally along a X-axis, and the second moveable arm is configured to travel horizontally along a Y-axis in conjunction with X-axis travel of the first moveable arm, relative to the predetermined position,
the third moveable arm is configured to travel vertically along a Z-axis in conjunction with X-axis and Y-axis travel of the first and second moveable arms, relative to the predetermined position, and
the sample container includes first and second ends, the sample being fixedly contained to the first end of the sample container, at least one of the first, second and third moveable arms being connected to the second end of the sample container, the movable sample holder being configured such that the sample container is moveable and spatially accommodatable between the objective and the frame in the X-axis, Y-axis and Z-axis while the first, second and third moveable arms are positioned away from between the objective and the frame.

3. The microscope of claim 2, wherein a travel distance along a X-axis or a Y-axis of at least one of the first moveable arm and the second moveable arm is about 50 to 200 mm.

4. The microscope of claim 2, wherein a travel distance along the Z-axis of the movable sample holder is about 50 to 200 mm.

5. The microscope of claim 2, wherein the second solution overlays the first solution such that the first solution does not contact an outer atmosphere.

6. The microscope of claim 2, wherein the first solution is selected from the group consisting of water, glycerol, histodenz, formamide (F), triethanolamine (TEA), and meglumine diatrizoate.

7. The microscope of claim 2, wherein the second solution is selected from the group consisting of silicone oil and microscope immersion oil.

8. The microscope of claim 2, wherein a Z-axis travel range of the sample container is about 50 to 150 mm.

9. The microscope of claim 2, wherein a height of the sample container is about 50 to 150 mm.

10. The microscope of claim 2, wherein the refractive index of the first and second solutions is about 1.4 to 1.52.

11. The microscope of claim 2, wherein the movable sample holder further includes a loading platform, the sample container being fixedly connected to an extension of the loading platform, the loading platform with the extension being configured so as to position the sample container at the focus of the objective while the sample container is moveable and spatially accommodatable between the objective and the frame in the X-axis, Y-axis and Z-axis while the first, second and third moveable arms are positioned away from between the objective and the frame.

* * * * *